(12) United States Patent
Sawaya et al.

(10) Patent No.: US 12,407,658 B2
(45) Date of Patent: Sep. 2, 2025

(54) SECURITY DEVICE FOR OBFUSCATING AND SECURING LAB EQUIPMENT

(71) Applicant: GENEINFOSEC, INC., Boulder, CO (US)

(72) Inventors: Sterling Sawaya, Boulder, CO (US); Aaron Hansen, Boulder, CO (US)

(73) Assignee: GENEINFOSEC, INC., Boulder, CO (US)

( * ) Notice: Subject to any disclaimer, the term of this patent is extended or adjusted under 35 U.S.C. 154(b) by 182 days.

(21) Appl. No.: 18/203,861

(22) Filed: May 31, 2023

(65) Prior Publication Data
US 2023/0396592 A1 Dec. 7, 2023

Related U.S. Application Data

(60) Provisional application No. 63/348,659, filed on Jun. 3, 2022.

(51) Int. Cl.
H04L 9/40 (2022.01)

(52) U.S. Cl.
CPC ........ *H04L 63/0428* (2013.01); *H04L 63/029* (2013.01); *H04L 63/1425* (2013.01)

(58) Field of Classification Search
CPC .................. H04L 63/0428; H04L 63/029; H04L 63/1425
See application file for complete search history.

(56) References Cited

U.S. PATENT DOCUMENTS

| | | | |
|---|---|---|---|
| 9,166,959 B2 * | 10/2015 | Chhabra | G06V 30/2247 |
| 9,223,995 B1 * | 12/2015 | Lavinio | H04L 63/0421 |
| 9,934,496 B1 * | 4/2018 | Hanscom | G06Q 20/02 |
| 10,042,993 B2 * | 8/2018 | Beigi | G06F 21/32 |
| 10,666,680 B2 * | 5/2020 | Rodniansky | H04L 67/14 |
| 10,693,638 B1 * | 6/2020 | Cignetti | G06F 21/602 |
| 11,133,940 B2 * | 9/2021 | Shockley | H04L 63/102 |
| 11,516,186 B1 * | 11/2022 | Ambaliya | H04L 63/0428 |
| 11,853,455 B2 * | 12/2023 | Dror | G06N 20/00 |
| 2006/0190999 A1 * | 8/2006 | Chen | H04L 63/02 726/11 |
| 2019/0281084 A1 * | 9/2019 | Rodniansky | H04L 63/0254 |
| 2022/0239636 A1 * | 7/2022 | Kreuzer | G06F 21/305 |
| 2023/0177181 A1 * | 6/2023 | Narayanan | G06F 21/6209 726/26 |

FOREIGN PATENT DOCUMENTS

WO WO-2022002352 A1 * 1/2022 ........... G06F 16/245

* cited by examiner

*Primary Examiner* — Christopher A Revak

(74) *Attorney, Agent, or Firm* — Michael Best & Friedrich LLP

(57) ABSTRACT

Data protection systems and methods. One system includes comprising a network security device including a security module and a firewall. The network security device is configured as an intermediary device between laboratory equipment and a communication network. The network security device includes a memory storing one or more applications, an input/output interface configured to receive data generated by the laboratory equipment, and an electronic processor. The electronic processor configured to, through execution of the one or more applications, modify the data received from the laboratory equipment to protect sensitive data included in the data, encrypt the data, as modified, to generate a data file, transfer the data file to one or more devices over the network, and prevent network traffic from reaching the laboratory equipment.

20 Claims, 4 Drawing Sheets

SECURITY DEVICE FOR OBFUSCATING AND SECURING LAB EQUIPMENT

RELATED APPLICATIONS

This application claims priority to U.S. Provisional Patent Application No. 63/348,659, filed on Jun. 3, 2022, the entire content of which is herein incorporated by reference.

FIELD

Embodiments described herein relate to the field of genomics and, in particular, to a dynamic control method and system providing a genetic data-generating equipment firewall and genetic data security by implementing data obfuscation and/or data encryption techniques.

SUMMARY

In some environments, a safety boundary can be established around data-generating equipment to prevent unauthorized access and/or manipulation of sensitive data generated by the equipment. This boundary can limit access across a network, through methods such as a firewall. This boundary can also apply encryption to ensure that generated data is secured in transit across a network and at rest on data storage equipment. Using a safety boundary can help to protect equipment and data that is generated in environments with cybersecurity challenges. In some instances, personnel or equipment within these environments require access to the data, in part or in whole, that is generated to ensure that the data-generating equipment has operated successfully. In such instances, this data access requirement can limit the effectiveness of the safety boundary, as the data must be decrypted and accessed within an insecure environment, potentially by individuals that pose an insider threat. In addition, data generated may be accessed by other individuals in environments with varying degrees of cybersecurity.

Embodiments described herein relate to a network security device for networks that contain data-generating equipment and application of a network security device to secure data that is generated in potentially insecure environments. For example, some embodiments comprise a method to: a) regulate network traffic to and from data-generating equipment; b) obtain the generated data and modify it to protect sensitive information, and c) apply encryption to the modified data prior to sending the data to one or more devices (e.g., data storage devices) across a network.

In some embodiments, network traffic is dynamically controlled by the network security device to ensure that communications between the device and the network prevent unwanted and/or unauthorized access to the device from the network and/or the data-generating equipment. In some embodiments, this control limits the traffic to and from the network security device to ensure that the data received by the network security device is limited only to data from the data-generating equipment to the predefined network storage devices.

In some embodiments, multiple encryption keys are generated on the network security device and used to encrypt different parts of the data and/or different files originating from the network security device. In these embodiments, multiple encryption keys can be used by the network security device to separately encrypt different files on the network security device. These encryption keys can then be used by appropriate personnel to allow differential access to the various encrypted files.

In some embodiments, the network security device generates decoy data. In some of these embodiments, decoy data is generated using, in part or in whole, data obtained from the data-generating equipment. In some of these embodiments, decoy data is combined with data obtained from the data-generating equipment. In such embodiments, a separate file generated by the network security device can be used to determine, in part or in whole, which data is decoy data, and this file can be encrypted with a unique encryption key.

In some embodiments, parts of the data obtained by the network security device from the data-generating equipment is masked by the network security device. In such embodiments, the masks that have been applied can be reversed, in part or in whole, using a separate file generated by the network security device. In these embodiments, the files that can be used to reverse the masking are encrypted with unique encryption keys. In these embodiments, the data obtained by the network security device can be scanned to determine which data will be masked.

In some embodiments, data obtained by the network security device from the data-generating equipment is randomly rearranged and files that can be used to rearrange the data, in part or in whole, are generated by the network security device. In these embodiments, the files that can be used to recover the data in full (i.e., before the rearranging) can be encrypted with their own unique encryption keys.

In some embodiments, data obtained by the network security device is parsed by the network security device for personally identifiable information. In these embodiments, personally identifiable information can be removed, obfuscated and/or masked by the network security device to reduce the identifiability of the data. In some of these embodiments, files that can be used to restore the personally identifiable information, in part or in whole, can be generated and encrypted with their own unique encryption keys.

In some embodiments, data obtained by the network security device is processed by the network security device to determine whether the data, in part or in whole, is considered sensitive, such as including protected health information. In these embodiments, the sensitive data can be modified, masked, rearranged, deleted, and/or have decoy data added (i.e., the sensitive data can be obfuscated). In some of these embodiments, a file is generated by the network security device that allows the sensitive data to be retrieved, in part or in whole, and this file can be encrypted with a unique key.

In some embodiments, the network security device provides validation of data integrity by the application of a one-way mathematical function on the data generated by the data-generating equipment.

Some embodiments provide a data protection system including a network security device including a security module and a firewall. The network security device is configured as an intermediary device between laboratory equipment and a communication network. The network security device includes a memory storing one or more applications, an input/output interface configured to receive data generated by the laboratory equipment, and an electronic processor. The electronic processor is configured to, through execution of the one or more applications, modify the data received from the laboratory equipment to protect sensitive data included in the data, encrypt the data, as modified, to generate a data file, transfer the data file to one or more devices over the network, and prevent network traffic from reaching the laboratory equipment.

Another embodiment provides a data protection method. The method includes receiving, at a network security device connecting a data-generating device to one or more computers, data from the data-generating device, the data to be transmitted to the one or more devices, modifying, with the network security device, the data received from the data-generating device to protect sensitive information included in the data, and generating, with the network security device, one or more encryption keys. The method also includes encrypting, based on the one or more encryption keys, the data, as modified, in part or in whole, on the network security device to generate a data file, transferring, with the network security device, the encrypted data file to the one or more computers, and regulating, with the network security device, network traffic to and from the network security device.

Other aspects will become apparent by consideration of the detailed description and accompanying drawings.

DETAILED DESCRIPTION

Figure 1:
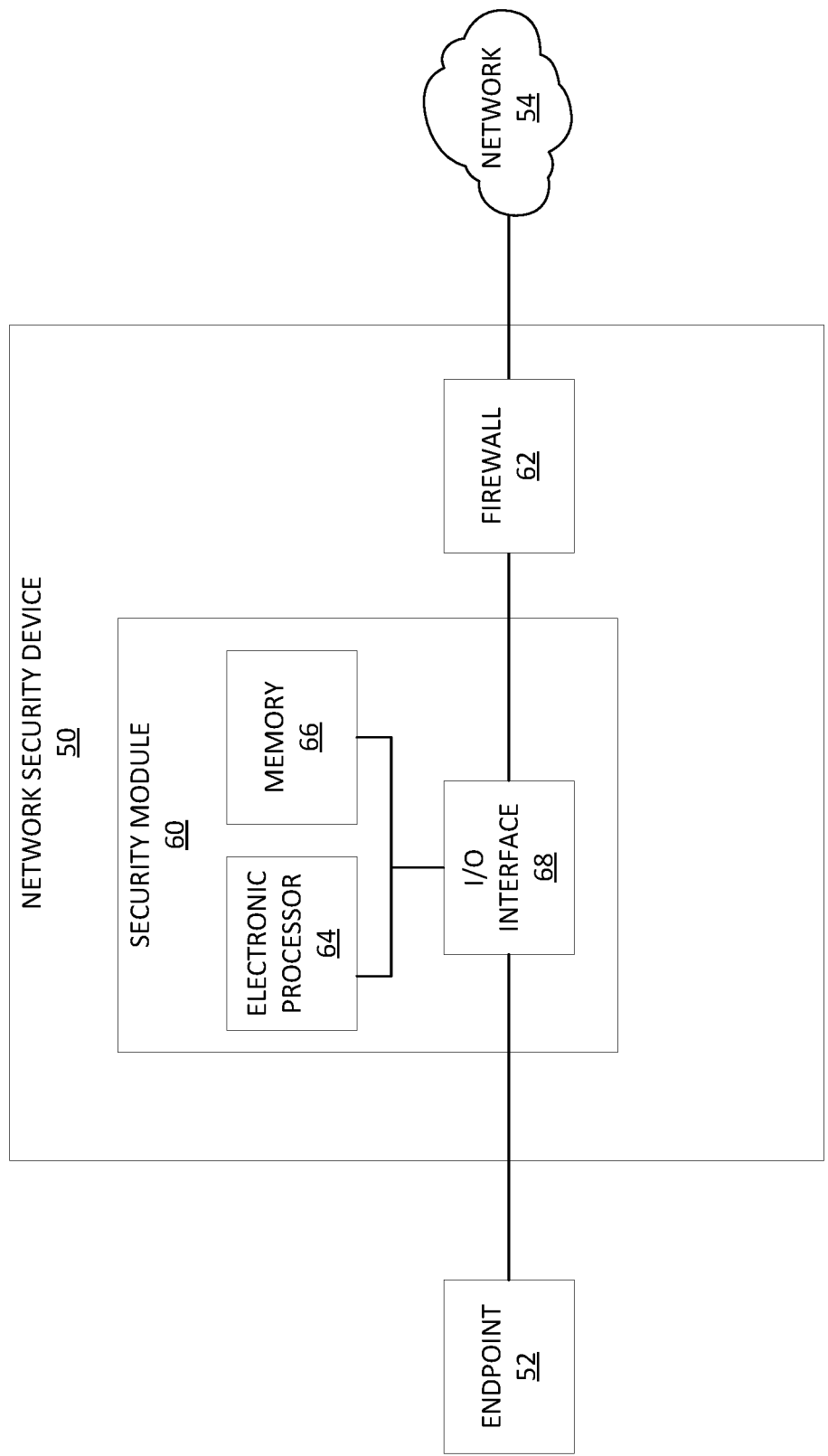
FIG. 1 schematically illustrates a network security device according to some embodiments.

Various embodiments are described herein, and those skilled in the art will recognize the embodiments described herein are provided only as examples. Those skilled in the art can change, substitute and/or vary certain aspects of the invention without departing from the present invention. The present invention described herein is not limited to specific materials, reagents nor a specific process. The terminology used herein is used to describe aspects of the invention for its implementation and is not intended to be limiting.

It should also be noted that a plurality of hardware and software-based devices, as well as a plurality of different structural components may be utilized to implement the embodiments provided herein. It should also be noted that a plurality of hardware and software-based devices, as well as a plurality of different structural components may be used to implement the invention. In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software-based devices, as well as a plurality of different structural components may be utilized to implement the invention. For example, "control units," "controllers," "control modules," "modules," "computers," "computing device," and the like described in the specification can include one or more processors, one or more application specific integrated circuits (ASICs), one or more memory modules including non-transitory computer-readable media, one or more input/output interfaces, and various connections (e.g., a system bus) connecting the components.

It will be appreciated that some embodiments may be comprised of one or more electronic processors such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, some embodiments may be implemented as a computer-readable storage medium having computer readable code stored thereon for programming a computer (e.g., comprising an electronic processor) to perform a method as described and claimed herein. Examples of such computer-readable storage media include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It should be understood that although certain drawings illustrate hardware and software located within particular devices, these depictions are for illustrative purposes only. In some examples, the illustrated components may be combined or divided into separate software, firmware and/or hardware in various configurations. For example, instead of being located within and performed by a single electronic processor, logic and processing may be distributed among multiple electronic processors. Regardless of how they are combined or divided, hardware and software components may be located on the same computing device or may be distributed among multiple different devices. Accordingly, in the claims, if an apparatus, method, or system is claimed, for example, as including a controller, control unit, electronic processor, computing device, logic element, module, or other element configured in a certain manner, for example, to perform multiple functions, the claim or claim element should be interpreted as meaning one or more of such elements where any one of the one or more elements is configured as claimed, for example, to make any one or more of the recited multiple functions, such that the multiple elements, as a set, collectively perform the multiple functions.

In this specification, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein and may be used interchangeably with "one or more" and "at least one" without implying distinct meanings. A device or structure that is "configured" in a certain way is configured in at least that way but may also be configured in ways that are not listed. Also, functionality described herein, unless otherwise noted, can be performed sequentially, in parallel, or a combination thereof.

As used herein, the term "sample" refers to any substance that is added to electronic equipment, such as for example, a DNA sequencer, an imaging modality, or other laboratory equipment, for the purpose of analysis, wherein the electronic equipment generates data relating to that sample (and, thus, is sometimes referred to herein as "data-generating equipment"). The exact composition and/or origin of the sample may or may not be known. The data generated from an analysis of the sample is attributable to that sample.

As noted above, a firewall may be used in laboratory environments for security purposes. However, modifications to configuration data for data-generating equipment may open a communication path to the data-generating equipment circumventing security otherwise provided via a firewall. For example, in these situations, a device may connect to the data-generating equipment and freely access data, modify, or destroy generated data so that the safety function of a network firewall is invalid. This access can also compromise the data-generating equipment, such as through malicious software downloaded to the data-generating equipment over the opened communication path. Embodiments described herein solve this technical problem by providing a dynamic control method of a firewall associated with data-generating equipment.

FIG. 1 schematically illustrates a network security device 50 according to some embodiments. As illustrated in FIG. 1, the network security device 50 is positioned between an endpoint 52 and a network 54 the endpoint 52 is connected to and, thus, is configured as an intermediary device between the endpoint 52 and the network 54 (and other devices communicating with the network 54, such as, for example, one or more data storage devices). The endpoint 52 can be data-generating equipment, such as for example, a DNA sequencer, a laboratory device, an imaging modality, a medical device, or the like that generates data regarding a sample. The endpoint 52 communicates with the network security device 50 via a wired or wireless connection, which can be a dedicated connection or a network connection. In some embodiments, the network security device 50 communicates with a plurality of endpoints 52 and may provide customized data processing as described below for each endpoint 52 or a particular type of endpoint 52. Similarly, in some embodiments, the network security device 50 communicates with a plurality of networks and, thus, regulates data traffic as described below across a plurality of networks.

The network security device 50 includes a plurality of electrical and electronic components that provide power, operational control, and protection to the components and modules within the network security device 50. In some embodiments, as illustrated in FIG. 1, the network security device 50 includes a security module 60 and a firewall 62. The network security device 50 can include additional components than those illustrated in FIG. 1 and functionality described herein as being performed by the network security device 50 (or a component thereof) can be distributed among one or more components of the device 50 in various configurations. The specific set and arrangement of components illustrated in FIG. 1 is purely illustrative.

In some embodiments, the firewall 62 includes a hardware firewall that is combined with (i.e., built-in) the security module 60 within a common housing. The firewall 62 is configured to block unauthorized egress traffic from the endpoint 52 and block unauthorized ingress traffic to the endpoint 52. In some embodiments, the firewall 62 is configured to block all ingress traffic to the endpoint 52. The firewall 62 can also be configured to apply encryption to data traffic, including hardware-based encryption, and can provide secure data storage of keys used for such encryption. The firewall 62 may include similar components as the security module 60 as described herein.

As described in further detail below, the security module 60 is configured to regulate traffic flow through the firewall 62 and process data received from the endpoint 52 prior to transmission (if authorized) to the network 54. The security module 60 may include one or more applications, executable by one or more electronic processors included in the network security device 50. For example, the network security device 50 (or, more particularly, the security module 60) may include an electronic processor 64 (e.g., an electronic microprocessor, microcontroller, field-programmable gate array, or similar device), a memory 66 (e.g., non-transitory, computer-readable memory), and an input/output interface 68. The network security device 50, the security module 60, or both can include additional or alternative components, including additional electronic processors and memory, additional interfaces, one or more application specific integrated circuits (ASICs), one or more input devices, output devices, or a combination thereof.

The input/output interface 68 is configured to transmit data to and receive data from one or more devices, networks, or systems external to the network security device 50. For example, as illustrated in FIG. 1, the network security device 50 is configured to communicate with the endpoint 52 and the network 54. In some embodiments, the input/output interface 68 also allows the security module 60 to communicate with the firewall 62, which is also configured to communicate with the network 54 and the endpoint 52 (e.g., directly or indirectly through the security module 60). In some embodiments, a separate communication channel (e.g., a dedicated connection) may be provided between the firewall 62 and the electronic processor 64 (e.g., as an alternative to or in addition to providing such communication through the input/output interface 68). The network 54 can be implemented using wired communication components, wireless communication components, or a combination thereof and may include various types of networks or interconnections, such as, for example, a cellular network, a land mobile radio network, a trunked radio network, a wide area network (such as, for example, the Internet), a local area network (such as, for example, a WiFi® network), a short-range wireless network or connection, or a combination of the foregoing. In some embodiments, the network security device 50 is configured to communicate with additional external devices using different networks and, in some embodiments, may communicate with one or more external devices through a direct connection as compared to a network connection. For example, in some embodiments, the network security device 50 may communicate with the endpoint 52 over a dedicated connection, wherein the network 54 may be a local area network or a wide area network. One or more data storage devices (computers or computing devices) can be connected to the network 54 (e.g., directly or through one or more intermediary networks or devices), wherein, as described below in more detail, the network security device 50 regulates egress and ingress traffic between the endpoint 52 and one or more data storage devices connected to the network 54.

Figure 2:
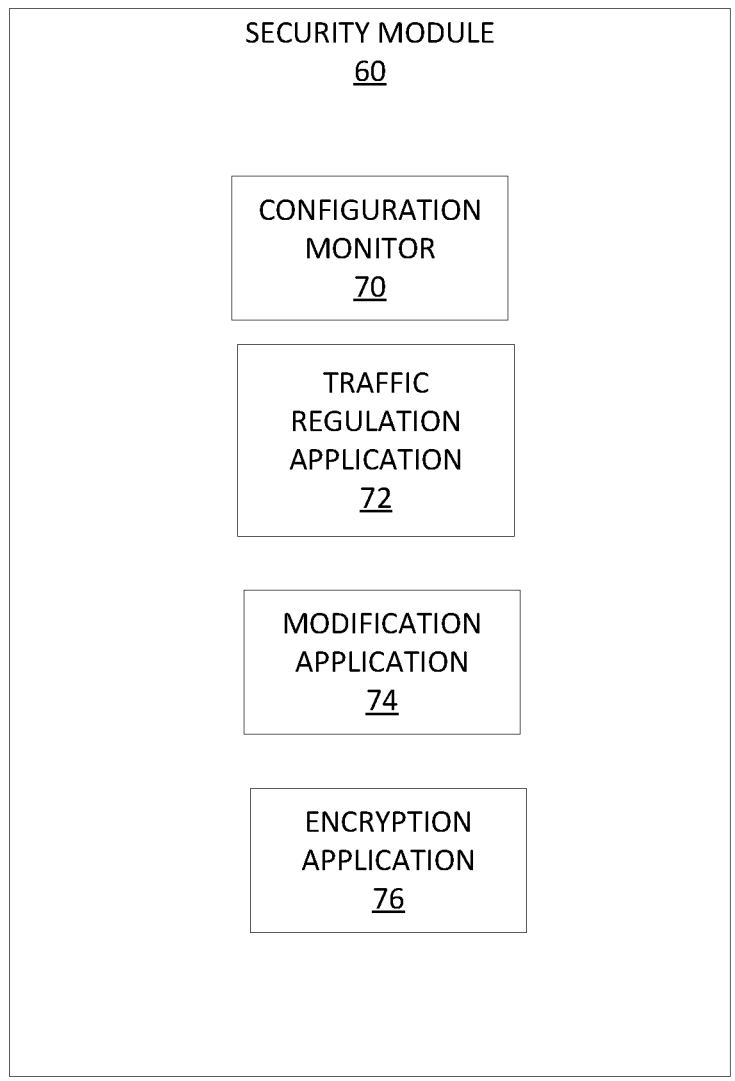
FIG. 2 schematically illustrates components of a security module included in the network security device of FIG. 1 according to some embodiments.

The electronic processor 64 is configured to retrieve from memory (e.g., the memory 66) and execute, among other things, instructions related to the control processes and methods described herein, which may be implemented as one or more applications or processes. For example, as illustrated in FIG. 2, the security module 60 (i.e., the memory 66) may include a configuration monitor or application 70, a traffic regulation application 72, a modification application 74, and an encryption application 76, which is distinct and separate from any encryption applied via the firewall 62. The number of applications or modules included in the security module 60 may vary and the functionality described herein as being performed by the applications and modules illustrated in FIG. 2 can be distributed and combined in various configurations. The electronic processor 64 executes one or more of the configuration monitor the traffic regulation application 72, the modification application 74, and the encryption application 76 as described in more detail below. Again, as previously noted, in some embodiments, one or more of the applications 70, 72, 74, and 76 may be executed by a plurality of electronic processors in a distributed nature.

The traffic regulation application 72, when executed, is configured to provide a dynamic traffic control method for an endpoint 52, such as, for example, data-generating equipment. For example, in some embodiments, the dynamic control method can comprise the steps of obtaining or determining a configuration of the data-generating equipment. In some embodiments, the configuration of the data-generating equipment includes a running state of the data-generating equipment, a firewall configuration of the data-generating equipment, or a combination thereof. When the running state is determined to be safely operating under parameters defined by an administrator of the system (e.g., the laboratory information system), the traffic regulation application 72 sends a control instruction to the firewall 62 according to the firewall configuration, wherein the control instruction instructs the firewall 62 to allow data communications initiating from the data-generating equipment to a secured storage device. In other words, in some embodiments, the hardware firewall 62 included in the network security device 50 must be authorized by the traffic regulation application 72 before the firewall 62 allows a connection between the data-generating device and a device on the network 54, such as a data storage device, and the traffic regulation application 72 provides such an authorization only after the traffic regulation application 72 confirms that the data-generating device is configured to adhere to implemented security requirements. Accordingly, the network security device 50 (e.g., via the traffic regulation application 72) regulates network traffic to and from the network security device 50 and, subsequently, network traffic to and from the endpoint 52. For example, in some embodiments, the network security device 50 regulates network traffic by allowing data transfer from the network security device 50 to other devices on the network 54 and dis-allowing all network traffic from the network security device to the endpoint 52 (i.e., data-generating equipment). In this configuration, the network security device 50 prevents any attempts to directly access data from the endpoint 52 (e.g., querying the endpoint 52 for such data or reading data from local memory of the endpoint 52), configuration the endpoint 52 (e.g., to send data to an authorized manner (e.g., over a disabled port, over an unsecure network connection, to an unauthorized device, in an unsecure (e.g., not encrypted) format, or the like).

The running state may be determined by the configuration monitor 70 after the traffic regulation application 72 receives a network connection notification sent by the data-generating equipment. After the running state is determined to be safe and, in response to receiving the control instruction from the traffic regulation application 72, the firewall 62 establishes a communications connection with data storage equipment for the purpose of transferring data generated by the data-generating equipment (and transmitted to the network security device 50) from the network security device to the data storage equipment. After the data transfer is complete, the firewall 62 closes the data communications channel and prevents further communications connections with the data-generating equipment unless they are approved by the traffic regulation application 72 as described herein.

In some embodiments, in addition to controlling data traffic as described above or independent of such control, the network security device 50, prior to transmitting data, subjects the data to one or more data security protocols to create "modified data" or "data files." The one or more data security protocols can include, for example, encryption, data obfuscation (e.g., addition of decoy data, removal of data (e.g., sensitive data), data masking, rearranging of data, or other modification), or a combination thereof. Accordingly, in some embodiments, data is received from the data-generating equipment by the network security device 50; the data is modified by the network security device 50 in a manner that provides data obfuscation and/or data encryption to generate a data file; and the generated data file is transferred to data storage equipment (e.g., through the firewall 62).

For example, in some embodiments, data modification performed by the network security device 50 (e.g., the modification application 74, as executed by the electronic processor 64) provides data confidentiality by protecting personally identifiable information within the generated data file. A data file can, in some embodiments, contain identifiable data. A data modification method used by the network security device 50, designed by those skilled in the art, can protect the identifiable data. For example, in some embodiments, information that is known to be identifiable, or that fits a pattern that has the potential to be identifiable (e.g., a social security number of an individual, a telephone number, birth date, etc.), is discovered by the network security 50 and is obfuscated, masked, or deleted. Other examples of such data modification methods are described below.

Similarly, as an alternative to or in addition to obfuscating data, the network security device 50 encrypts data (e.g., via the encryption application 76, as executed by the electronic processor 64) to apply an additional level of data confidentiality (e.g., in addition to any encryption performed by the firewall 62). After implementation and normal operation of the data-generating equipment, the network security device 50 can protect the data that is generated by applying data encryption techniques, such as, for example, AES 256, and, in some embodiments, may use different encryption keys for different files or different portions of a file. Further details regarding such encryption are provided below.

Figure 3:
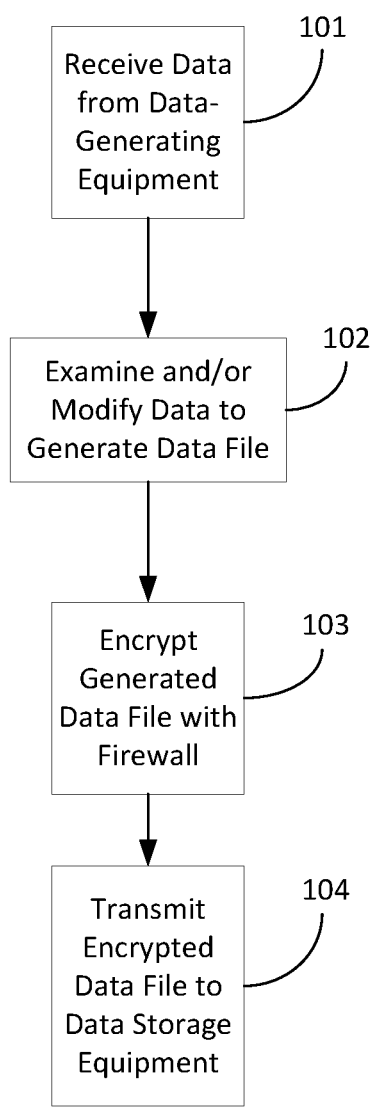
FIG. 3 depicts a workflow diagram for the application of the network security device according to some embodiments.

FIG. 3 depicts a workflow diagram for the application of the network security device 50 as described above according to some embodiments. It should be understood that the functionality described with respect to FIG. 3 and the depicted workflow may be performed via execution of one or more of the applications 70, 72, 74, and 75 by the electronic processor 64. As illustrated in FIG. 3, at block 101, the network security device receives data sent by the endpoint 52 (e.g., data-generating equipment). At block 102, the network security device 50 applies a security process to examine and/or modify the received data to generate a data file. For example, the electronic processor 64 included in the network security device 50 may perform the data examination and/or modification via execution of the configuration monitor 70, the traffic regulation application 72, the modification application 74, the encryption application 76, or a combination thereof as described herein. Further details regarding how the network device 50 may be configured modify and/or encrypt the received data at block 102 are provided below. For example, this portion of the workflow may include one or more of generating decoy data and adding the decoy data to the data, masking at least a portion of the received data, randomly rearranging at least a portion of the received data, identifying and modifying, masking, rearranging, deleting, and/or adding decoy data for the identified sensitive data in the received data (e.g., personal health information), and encrypting the data or a portion thereof using one or more encryption keys. As also described in more detail below, in some embodiments, the network security device 50 generates one or more files (also referred to herein as "instruction files") that can be accessed and used by a device accessing the modified data (as stored on a data storage device) to un-do or otherwise reverse all or a portion of the modification applied via the network security device 50. These files may also be encrypted and may be encrypted using one or more keys separate from keys used to encrypt the modified data. This separation and separate encryption of the modified data and the "instructions" enhances data security.

At block 103, the firewall 62 applies an encryption process to the generated data file. The encrypted data file is then sent to the data storage equipment at block 105 (e.g., through the firewall 62). Any files created by the network security device 50 related to the data files transmitted by the firewall 62 (e.g., files for reversing modifications applied by the network security device 50) may similarly be encrypted and transmitted by the firewall 62 and may be transmitted combined with or separate from the generated data file and, in some embodiments, may be transmitted and stored on separate devices from the device storing the generated data file. Keys associated the encrypted files (e.g., as encrypted by the network security device 50, the firewall 62, or both) may also be shared or transmitted with other devices. As noted above, in some embodiments, symmetric keys may be used to perform one or both of the levels of encryption, and, thus, in these embodiments, the network security device 50 may transmit the keys used to encrypt the data to one or more authorized devices, repositories, or the like. Other types of encryption may also be used, such as, for example, public and private key encryption, and keys may be exchanged or established based on the type of encryption implemented by the network security device 50. Also, in some embodiments, an additional device or system may be configured to generate or establish keys used via the network security device 50 and devices authorized to access data transmitted by the network security device 50.

Figure 4:
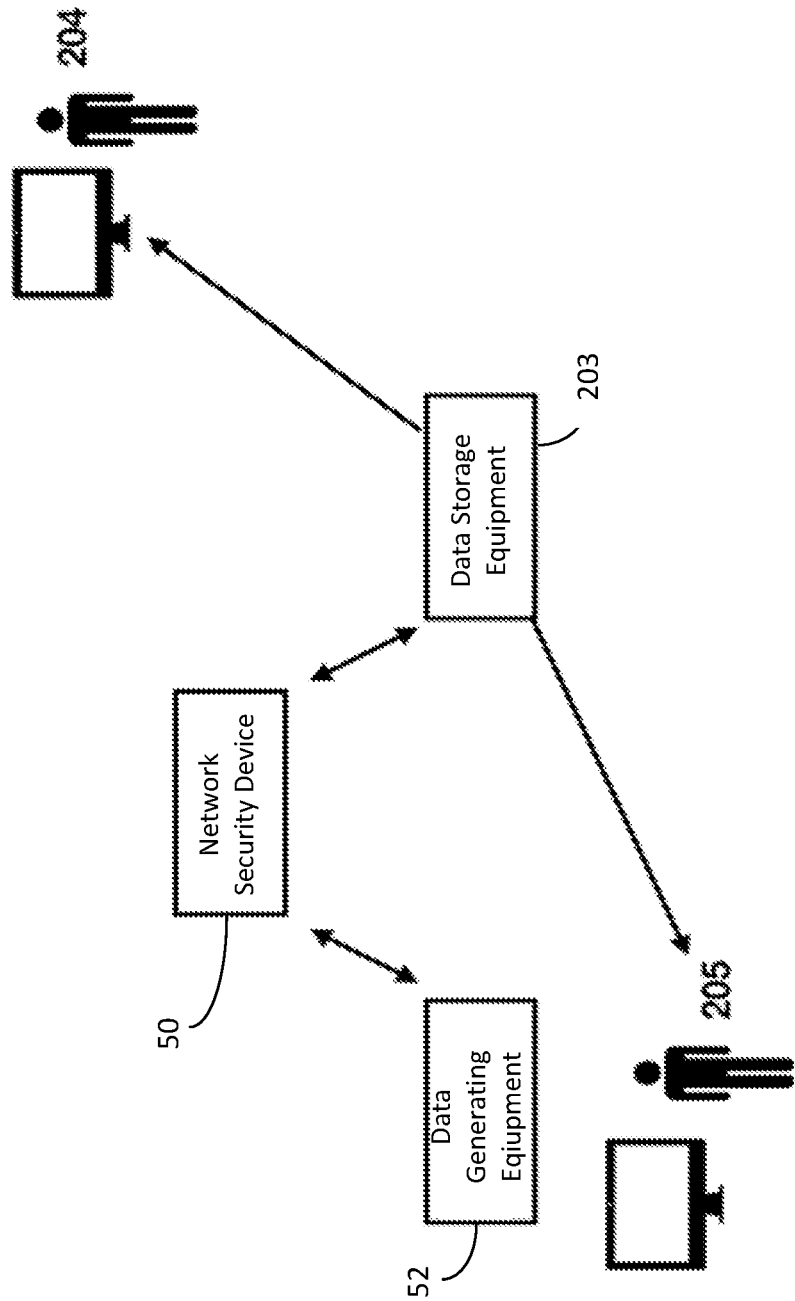
FIG. 4 depicts a workflow diagram for data access for multiple users according to some embodiments.

In some embodiments, the network security device 50 (e.g., the encryption application 76) is configured to generate multiple encryption keys, which creates restricted access to data by different parties with varying degrees of data security requirements. For example, FIG. 4 depicts a workflow diagram for data access for multiple users. It should be understood that the functionality described with respect to FIG. 4 and the depicted workflow may be performed via execution of one or more of the applications 70, 72, 74, and 75 by the electronic processor 64. As illustrated in FIG. 4, the data obtained from the data-generating equipment 52 and encrypted by the network security device 50 is sent (e.g., over the network 54) to data storage equipment 203, which may be a database, a server, or other data storage device or network (e.g., cloud storage). The data storage equipment 203 can be accessed (e.g., over the network 54 or a separate network) by multiple devices (e.g., used by different users with different levels of access), but, in some embodiments, separate keys are generated by the network security device 50 and used to decrypt different data files or portions thereof. For example, in this embodiment, one user device or terminal 204 (being used or associated with one individual) can use one or more encryption keys to access one or more of the data files stored in the data storage equipment 203, while another user device or terminal 205 (being used or associated with a different individual) can use different encryption keys (assigned to the different individual) to access other data files stored in the data storage equipment 203. In other words, in some embodiments, encryption keys assigned to one individual only allow that individual to access particular data files or portions thereof stored in the data storage equipment 203 that were encrypted based on the assigned encryption keys without allowing the individual to access all data files or all portions of a data file stored in the data storage equipment 203.

Similarly, in some embodiments, the network security device 50 is configured to create unique data files from the original data received from the data-generating equipment. The unique data files can have specific data obfuscation and encryption applied to protect the data based on the use cases for data analysis and research personnel. For example, in some embodiments, the network security device 50 (e.g., the modification application 74 as executed by the electronic processor 64) is configured to duplicate the original data received from the data-generating equipment 52 and use the duplicate to create a masked data file, a reordered data file, and/or data file that, in part, contains decoy data. The network security device 50 can also be configured to hash the original data to preserve integrity and confidentiality of the original data. Various files can then be encrypted with encryption keys that, in some embodiments, are unique for each file. These encrypted files and the hash of the original data can then be sent across the network to be stored. The original data can be subsequently referenced with devices (individuals using such devices) having appropriate access permissions to verify portions of the masked, reordered, and/or decoy data.

To mask data received from the data-generating equipment 52, the network security device 50 is configured to obfuscate the data in a manner that masks or removes specific portions of the data to hide identifiable data while preserving the rest of the data.

As an alternative to or in addition to masking data, in some embodiments, the network security device 50 is configured to rearrange received data to obfuscate data in a manner that transposes various portions of the data to confuse the viewer in the event that confidentiality of the data is compromised. For embodiments in which the order of the data reveals information (e.g., about an individual or group of individuals or other sensitive information), such as the attribution of the data to a single sample, the relative time at which the data was generated and/or any other information related to the ordering of the data, this rearranging can conceal the information. In such embodiments, an encrypted file, which can be used to rearrange the data to retrieve the data in its original form, can be generated by the network security device 50.

As an alternative to or in addition to masking or rearranging data, in some embodiments, the network security device 50 is configured to generate a data file by combining the data from the data-generating equipment with other data (i.e., decoy data) so that sensitive data is obfuscated. In some embodiments, the decoy data is generated and provided by the data-generating equipment 52. In other embodiments, the decoy data is generated by the network security device 50, such as, after the device 50 obtains the data from the data-generating equipment 52. For example, when the network security device 50 is configured to generate the decoy data, the device 50 may use the received data to generate the decoy data to ensure that appropriate decoy data is used. Further details regarding generating decoy data according to some embodiments are provided below. The decoy data generation methods can, for example, ensure that decoy data is difficult or impossible to distinguish from the data generated by the data-generating equipment 52. These methods can also ensure that the decoy data generated sufficiently conceals and/or obfuscates sensitive data. In such embodiments, the network security device 50 is also configured to generate an encrypted file including data that reveals, in part or in whole, which data included in a data file generated by the network security device 50 is decoy data. Accordingly, only an authorized device with the appropriate key is configured to decrypt the encrypted file and use the file to identify what data in a file is original and what data is decoy data. Thus, even if security of a data file including generated data is compromised, an unauthorized user may still not know what data in the file is true and what data is a decoy as the unauthorized user does not have access to the file providing this metadata.

As an alternative to or in addition to masking, rearranging, or generating decoy data, the network security device 50, in some embodiments, is configured to encrypt a generated data file (e.g., via the encryption application 76). As noted above, in some embodiments, the firewall 62 also applies an additional layer of encrypt to an encrypted data file. The encrypted data files will be transmitted to a secure storage device (e.g., the data storage equipment 203) and available for analysis based on the role and/or need of the lab personnel.

As noted above, in some embodiments, the network security device 50 is also configured to provide data verification. For example, the network security device 50 can be configured to perform data verification by applying a one-way mathematical function to the data generated by the data-generating equipment 52 and/or the data file generated by the network security device 50 (e.g., at any point during any modification applied by the network security device 50 as part of generating the data file). The one-way mathematical function can be performed using a hashing algorithm or other method determined by those skilled in the art, which may vary based on the type of data included in the data file. These methods permit data verification such that subsequent use of a data file can trigger performance of a verification hash, which can be compared to the original hash. If there is a change between the hashing algorithm outputs, the data file is presumed to be corrupt.

Without limiting the foregoing description of various embodiments, some example embodiments are described below and may be implanted using the security device 50 and associated hardware and software devices described above.

Examples

An exemplary embodiment, in which the data-generating equipment 52 produces genetic data, can offer an example of the application of the network security device 50. In this exemplary embodiment, a DNA sequencer is the data-generating equipment. The network security device 50 can connect to the DNA sequencer through a port that allows data to be transferred to the network security device 50. In some embodiments, to prevent unauthorized access to the DNA sequencer and/or data exfiltration, all other ports that allow data transfer or network activity are disabled on the DNA sequencer and/or are not in use.

In this exemplary embodiment, the DNA sequencer generates genetic sequence data from multiple different samples simultaneously. In these embodiments, the genetic data generated can be attributed to a specific sample by an identifier, index, or tag present in the data generated by the DNA sequencer. The network security device 50 accepts data from the DNA sequencer that comprises, in part or in whole, the data that is generated by the DNA sequencer. In some embodiments, this data is scanned for any identifier (also known as an index or tag) that directly indicates that a particular segment of DNA that has been sequenced belongs to any particular sample. A new data object is created in which each of these identifiers are replaced by one or more hash tags that uniquely identify subsets of the data and a hash table is generated that permits data subsets, in part or in whole, to be corresponded back to their sample of origin. For example, if the DNA data from a single sample is tagged with an index of the DNA sequence GTCACATA, the security device 50 may be configured to remove all of these indexes from the file and replace each index with unique, secure indexes (e.g., hash tags) for which their attribution can be done using the hash table. This data generated by the network security device in which unique hashes are added in place of sample identifiers, can then be randomly rearranged such that subsets of the data are rearranged in a sufficiently random order such that those of skill in the art would consider the new order to appropriately conceal the order in which the subsets were originally generated by the DNA sequencer.

In this exemplary embodiment, the network security device 50 can, in some embodiments, scan the data to determine whether sensitive information is present. This information can be, in some embodiments, personally identifiable information, protected health information, or any other information deemed sensitive by those skilled in the art. The information can be deemed sensitive for various reasons determined by those skilled in the art, such as, for example, the information matches a list of known sensitive information and/or has the formal of data that is considered sensitive. Identified sensitive information can then be masked by the network security device 50 and, in some embodiments, a separate file can be generated by the network security device 50 that allows the masks to be removed, in part or in whole. The network security device 50 can encrypt this generated file to control access to the file and consequently the unmasked data. In some embodiments, the generated file for removing the masks may be encrypted with a different key than any encryption applied to the data file including the masks, which, again, increases a level of data security.

In this exemplary embodiment, the network security device 50 can generate data that can serve as decoy data. In some of these exemplary embodiments, the generation of the decoy data can utilize the data received in one or more instances from the data-generating equipment 52 and machine learning to generate decoy data such that the decoy data is, in general, indistinguishable, in whole or in part, from the data obtained from the data-generating equipment 52. For example, a generative model may be used generate decoy data based on data obtained from the data-generating equipment 52 (or a pool of such devices) or characteristics of such data. In this implementation, the generated decoy can have random aspects but also generally match the true data generated by the equipment. Without this random aspect or conformity, a user may be able to decipher which data is true and which data is decoy. In some of these exemplary embodiments, a file is generated by the network security device 50 that can be used to determine which data is decoy and which data originated from the data-generating equipment.

Accordingly, in some examples, the network security device 50 may modify the data received from the DNA sequencer by identifying personal health information within the received data and modify the personal health information, mask the personal health information, rearrange the personal health information, delete the personal health information, add decoy data for the personal health information, or a combination thereof. The network security device 50 is also configured to generate an instruction file including data for retrieving the personal health information (e.g., identify how the received data was modified and, thus, how the modification can be reversed to retrieve the personal health information). This instruction file may be encrypted with a unique key (e.g., a key different from the key used to encrypt the received data as modified by the network security device 50).

In this exemplary embodiment, the use of multiple encryption keys can be applied by the network security device 50 and such keys can be associated with different individuals, different user roles or access levels within a laboratory, or the like. One set of encryption keys can be used by an individual in the lab to examine the data generated by the network security device 50. This lab individual only requires the ability to determine that the functions of the DNA sequencer was successful but is not required to determine which parts of the data, if any, were decoys and could determine that the DNA sequencer's operations were successful without the need to access potentially sensitive information that had been obfuscated or masked by the network security device. The other set of encrypted keys can then be used by an analyst that requires access to the entirety of the data. Accordingly, in some embodiments, the network security device 50 generates multiple different encryption keys, wherein each different encryption key is applied to a different part of the data received (and optionally modified) by the network security device 50 from the DNA sequencer before the data is transmitted to one or more data storage devices.

Another exemplary embodiment, in which the data-generating equipment produces diagnostic data (i.e., the data-generating equipment includes a diagnostic device), can offer another example of the application of the network security device 50. In this embodiment, it is assumed that the data generated by the diagnostic device is highly sensitive and that there is a need to secure such data as soon as it is generated. However, the individual that is operating the diagnostic device may have a need to access the data in a way that allows the individual to determine whether the diagnostic device has generated appropriate data. In such an embodiment, the network security device 50 obtains diagnostic data from the diagnostic device and generates decoy data. As noted above, in some of these embodiments, the data obtained from the diagnostic device is used, in part or in whole, to generate the decoy data. A file is generated by the network security device 50, which can be used to determine which data is decoy and which data originates from the diagnostic device. In some embodiments, this generated file is encrypted.

For example, as one example, the data generated by the diagnostic device may be a 0, 1, or ERROR. The network security device 50 generates a list of random decoys of 0 or 1 but never ERROR and combines the decoy data with the data received from the diagnostic device to generate a data file. A lab tech, for example, using one set of encryption keys, can then be granted access to the generated data file to check for ERROR without being able to determine the exact results output by the diagnostic device. In some embodiments, a doctor or analyst, using another set of encryption keys including a key to the file including data identifying the decoy data included in the generated data file, can obtain the full results and provide a diagnosis or analysis.

It should be understood that the network security device 50 can perform any combination of the above functionality and may modify the functionality applied to particular received data based on configuration settings for the network security device 50, a type of data-generating equipment providing the data, a type of data provided by the data-generating equipment, content of data provided by the data-generating equipment, a type of network 54 the data-generating equipment is communicating over, a type of data storage device, or a combination thereof. For example, in some embodiments, data received by the network security device 50 from a diagnostic device may be modified by combining the data with decoy data and encrypting the resulting combination, wherein data received by the network security device 50 from a DNA sequencer may be modified by replacing tags with hash tags, randomly rearranging the data including the hash tags, and encrypting the resulting data. The network security device 50 may store one or more profiles that includes one or more rules specifying how to process received data.

In some embodiments, files and hash tables generated by network security device 50 can each have their own unique encryption keys. Accordingly, using the unique encryption keys a lab tech can access the fully masked, rearranged, and decoy-added data file generated by the network security device 50. However, a first analyst (having additional encryption keys) can access sample level information, but masks and decoys remain, and a second analyst (having all applicable encryption keys) can access the full information (e.g., as generated via the data-generating equipment).

Accordingly, embodiments described herein provide a network security device positioned between an endpoint and a network the endpoint is connected to. The network security device includes a built-in firewall (e.g., hardware firewall) that may be configured to uniquely work with the endpoint to restrict incoming and outgoing communications per user or environment needs. The network security device also includes a security module that adds a redundant layer of encryption, integrity verification, data modification, authorization and authentication, or a combination thereof to communications between the endpoint and the network. Thus, in some embodiments, the network security device implements a distributed model of zero trust in environments including laboratory and medical devices where zero trust is difficult to implement, as communications between the endpoint and the network is uniquely authenticated, authorized, and secured.

Various features and advantages of the embodiments presented herein are set forth in the following claims.

What is claimed is:

1. A data protection system comprising:
a network security device including a security module and a firewall, the network security device configured as an intermediary device between laboratory equipment and a communication network, the network security device including:
  a memory storing one or more applications;
  an input/output interface configured to receive data generated by the laboratory equipment;
  an electronic processor configured to, through execution of the one or more applications:
    modify the data received from the laboratory equipment to protect sensitive data included in the data;
    encrypt the data, as modified, to generate a data file;
    transfer the data file to one or more devices over the network; and
    prevent network traffic from reaching the laboratory equipment,
  wherein the electronic processor is further configured to generate an instruction file identifying how the data was modified and encrypt the instruction file.

2. The data protection system of claim 1, wherein the network security device further includes a firewall and, wherein, the electronic processor is configured to transfer the data file via the firewall.

3. The data protection system of claim 2, wherein the firewall is configured to encrypt the data file prior to transferring the data file.

4. The data protection system of claim 2, wherein the electronic processor is further configured to determine a configuration of the laboratory equipment and selectively instruct the firewall to allow data communication initiating from the laboratory equipment to the one or more devices.

5. The data protection system of claim 4, wherein the configuration of the laboratory equipment includes at least one of a running state and a firewall configuration of the laboratory equipment.

6. The data protection system of claim 1, wherein the instruction file is encrypted with a separate key from one or more keys used to encrypt the data as modified.

7. The data protection system of claim 1, wherein the electronic processor is configured to modify the data received from the laboratory equipment by performing at least one selected from a group consisting of generating decoy data and adding the decoy data to the data, masking at least a portion of the data, randomly rearranging at least a portion of the data, and deleting the data.

8. A data protection method comprising:
receiving, at a network security device connecting a data-generating device to one or more computers, data from the data-generating device, the data to be transmitted to the one or more devices;
modifying, with the network security device, the data received from the data-generating device to protect sensitive information included in the data;
generating, with the network security device, one or more encryption keys;
encrypting, based on the one or more encryption keys, the data, as modified, in part or in whole, on the network security device to generate a data file;
generating, an instruction file identifying how the data was modified;
encrypting the instruction file, based on the one or more encryption keys, the instruction file;
transferring, with the network security device, the encrypted data file and the encrypted instruction file to the one or more computers; and
regulating, with the network security device, network traffic to and from the network security device.

9. The method of claim 8, wherein regulating the network traffic includes allowing data transfer from the network security device to other devices on the network and disallowing all network traffic from the network security device to the data generation device.

10. The method of claim 8, wherein generating the one or more encryption keys includes generating multiple different encryption keys, wherein each different encryption key is applied to a different part of the data on the network security device.

11. The method of claim 8, wherein modifying the data includes generating decoy data and adding the decoy data to the data.

12. The method of claim 11, wherein generating the decoy data includes generating the decoy data based on the data received from the data-generating equipment, wherein the data received from the data-generating device is indiscernible from the decoy data.

13. The method of claim 11, wherein adding the decoy data to the data received from the data-generating equipment includes combining the decoy data with the data received from the data-generating device while preserving the accuracy of the data received from the data-generating device and reducing a correlation between the data received from the data-generating device and a unique person, wherein the instruction file includes data identifying the decoy data in the data, as modified, and wherein the instruction file is encrypted with a unique key.

14. The method of claim 8, wherein modifying the data includes masking at least a portion of the data received from the data-generating equipment and wherein the instruction file includes data for unmasking the masked data.

15. The method of claim 8, wherein modifying the data includes randomly rearranging the data received from the data-generating equipment, in part or in whole and wherein the instruction file includes data for rearranging the data, as modified, into an original state.

16. The method of claim 8, wherein modifying the data includes identifying the sensitive data within the data received from the data-generating equipment and performing at least one selected from a group consisting of modifying the sensitive data, masking the sensitive data, rearranging the sensitive data, and deleting the sensitive data.

17. The method of claim 8, wherein modifying the data includes identifying personal health information within the data received from the data-generating equipment and performing at least one selected from a group consisting of modifying the personal health information, masking the personal health information, rearranging the personal health information, deleting the personal health information, and adding decoy data for the personal health information, wherein the instruction file includes data for retrieving the personal health information from the data, as modified, and wherein the instruction file is encrypted with a unique key.

18. The method of claim 8, further comprising generating, with the network security device, a hash of the data received from the file and using the hash to verify, with the network security device, integrity of subsequently received data.

19. The method of claim 8, further comprising applying an additional level of encryption to the encrypted data file generated by the network security device before transmitting the encrypted data file to the one or more computers.

20. The method of claim 19, wherein applying the additional level of encryption includes encrypting the data file generated by the network security device with a firewall included in the network security device.

\* \* \* \* \*